Figure 1:
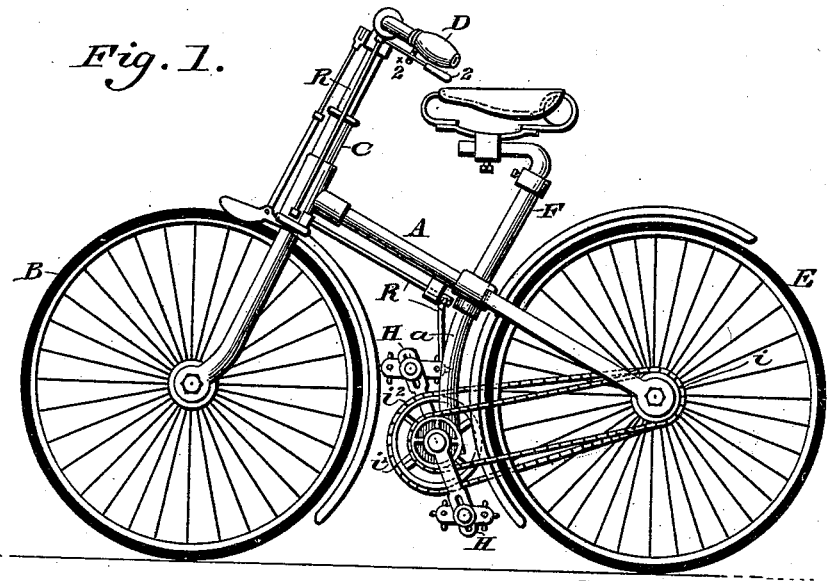

(No Model.)

J. B. EVANS.
BICYCLE.

No. 464,790. Patented Dec. 8, 1891.

WITNESSES:
Joshua Pusey
P. F. Chaples

INVENTOR
John B. Evans
BY Strawbridge & Taylor
ATTORNEYS

UNITED STATES PATENT OFFICE.

JOHN BENJAMIN EVANS, OF PHILADELPHIA, PENNSYLVANIA.

BICYCLE.

SPECIFICATION forming part of Letters Patent No. 464,790, dated December 8, 1891.

Application filed June 22, 1891. Serial No. 397,016. (No model.)

*To all whom it may concern:*

Be it known that I, JOHN BENJAMIN EVANS, a citizen of the United States, residing in the city and county of Philadelphia, and State of Pennsylvania, have invented certain new and useful Improvements in Bicycles, of which the following is a specification.

My invention relates to bicycles in which the axle of the driving wheel and the crank axle are each provided with a pair of sprocket wheels, those on the driving wheel axle being conveniently of the same diameter, and those on the crank axle being of different diameters, said wheels on the crank axle being geared with those on the driving wheel axle,—and in which the crank axle is provided with a clutch by which it may be locked at will to either of its sprocket wheels,—the arrangement being such that the bicycle may be geared for either speed or power at will.

In Letters Patent of the United States No. 449,581, granted March 31, 1891, I have shown described and claimed a bicycle of the foregoing character in which the crank axle is supported in a casing and equipped or provided therein with a ball bearing, for a detailed description of which, however, and for a description of the other features of improvement constituting said invention, reference is to be made to said Letters Patent themselves. In the arrangement described in the said Letters Patent, however, while a double set of balls is provided between the axle and the casing, friction still exists between the crank axle, and the sprocket wheel which is for the time being idle or not locked to it,—and further can, under certain circumstances, exist between the end of the encircling casing and the hub of the sprocket wheel which is locked to the axle.

It is the object of my present invention to construct and arrange a sprocket-wheel-equipped crank axle, inclosed in a casing, and provided with ball bearings, in such manner that with great simplicity of structure shall be combined the advantage that all movements of the wheels with reference either to the axle or casing are eased by ball bearings and at the same time the wear of the balls or ball races may be taken up or compensated for.

A further object of the present invention is to so arrange a sprocket wheel upon the pedal- or crank-axle upon which it is mounted and to which it is at will connected for rotation through the medium of a longitudinally movable clutch or otherwise, that, when the machine is in use, said clutch can be withdrawn from engagement with the sprocket wheel and the crank axle held against rotation while the sprocket wheel continues its rotation thereon, as hereinafter explained.

Figure 2:
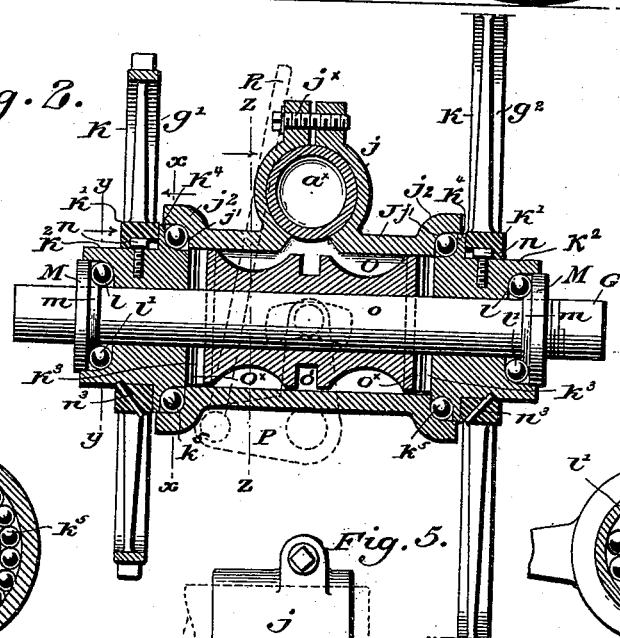
Figure 3:
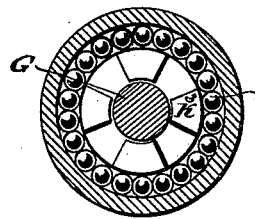
Figure 4:
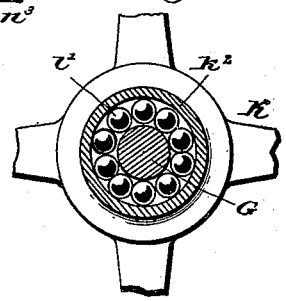
Figure 5:
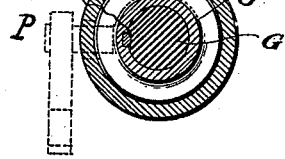

In the drawings, Figure 1 is a view in side elevation of a bicycle embodying my invention. Fig. 2 is a central longitudinal vertical partly sectional elevation through the crank axle its casing and associated parts. Fig. 3 is a transverse vertical sectional elevation taken on the line $x$—$x$ of Fig. 2. Fig. 4 is a transverse vertical sectional elevation taken on the line $y$—$y$ of Fig. 2. Fig. 5 is a transverse vertical sectional elevation taken on the line $z$—$z$ of Fig. 2.

Similar letters of reference indicate corresponding parts.

In the drawings, A represents the main frame of the machine, which may be of any preferred construction usual in bicycles. B is the front or pilot wheel; C the front fork and fork standard of said wheel; D the steering handle; E, the rear or driving wheel; and F the saddle support upon the main frame. All of the foregoing parts are those usual in machines of the class represented.

G is the crank axle, and $g'$ $g^2$ a pair of sprocket wheels mounted so as to run freely upon the respective extremities of said axle,—$g'$ being a minor, and $g^2$ a major, sprocket wheel.

H H are a pair of driving pedals respectively applied to the respective extremities of the crank axle outside of the sprocket wheels. The axle of the driving wheel is equipped with a pair of sprocket wheels $i$, which are by means of the chains $i'$ and $i^2$ in gear with the wheels $g'$ and $g^2$ respectively.

J is a cylindrical casing which contains and supports the crank axle and its connected parts, and which is in turn connected with the main frame of the bicycle in any convenient manner, as, for instance, by the depending hanger $a$, from the lower end of which projects a stud $a^\times$ clasped by a pair of arms $j$ rising from the casing and secured together above said stud by a thumb screw $j^\times$. Each of the sprocket wheels $g'$ $g^2$ embodies in its hub a clutch face, and two ball race grooves, and it being desirable that the hub portions should be of metal much more durable than is required for the remaining portions of said wheels, I form each wheel in two parts, an outer designated K, and comprising the rim, spokes, and ring K',—and an inner designated $K^2$, and constituting the hub. The inner face of each hub $K^2$ embodies, as stated, a clutch face $K^3$ and the rim of each inner face is recessed to form an annular groove or ball race $K^4$, which groove being formed in the corner portion of each hub opens through or faces both its top and side, is hereinafter termed the rim groove, and is, so to speak, oblique or inclined. The outer edges of the casing J overhang or inclose the inner portions of the respective hubs, and said edges are flared or recessed as at $j^2$ to form in each a groove $j'$, which grooves face the respective grooves $K^4$ and are correspondingly oppositely inclined, so that the opposing pairs of grooves form ball races, in which are situated balls $K^5$ to form ball bearings. The outer face of each hub embodies a recess $l$, surrounding its axial aperture, opening both upon the axle and upon or through the end of said hub, so as to form an inclined groove or ball race termed hereinafter the bore groove, the outer openings of which recesses are closed by the collars M, circumscribing the axle, and embodying inner faces $m$ curved in a direction opposite to the curvature of the inner portion of the recesses $l$, to complete the ball races, within which are placed the balls $l'$. It will be understood that both ball races described, being formed by opposing pairs of grooves placed in inclined or oblique relationship to each other, may be adjusted as to size by causing the parts in which the respective grooves are formed to approach or recede from each other, and that therefore wear of the balls or of the metal of the ball races may be compensated for, and to permit such taking up or compensation one of the collars M is screw threaded upon the crank axle. The exterior of the hub embodies a squared recess or seat to receive the ring K' of the part K of the wheel, and in said seat may be located square headed pins, $n$, which take into square recesses in the inner face of the ring K' so that when the parts are assembled the hub and body of each wheel may be rotated together. To secure the body K of the wheel against withdrawal from the hub, screws $n^3$ may pass obliquely as shown through the ring K' and be slightly sunk into the metal of the hub.

O is a clutch, circumscribing the crank axle, and keyed thereto by a key $o$ which permits its longitudinal movement upon, but compels its rotation with, the axle. The clutch is provided at each end with a clutch face $o^\times$, so that it may be thrown into engagement with the clutch faces of either of the wheels $g'$ $g^2$ at will, and is of such size that when occupying its central position it is out of engagement with both said clutch faces.

To provide for the throw of the clutch, I form it with a central transverse groove $o'$, in which the arm of a bell-crank lever P supported at the side of the casing in any convenient manner is constantly engaged. The bell crank lever or other clutch throwing contrivance is conveniently operated through a system of bell crank and link connections R through which the movements of a hand lever Q applied to the steering handle D are transmitted to it.

$Q^\times$ is a rack depending from the handle D and embodying recesses designed to receive and hold the lever Q, each recess being adapted to hold it in one of the three respective adjustments of which said lever is capable in placing the clutch in its respective positions of engagement with the large sprocket wheel, of disengagement from both wheels, or of engagement with the small or minor sprocket wheel.

In the practical employment of my invention, as will be understood, when the clutch is in engagement with the minor sprocket wheel, the clutch, wheel, and axle, carrying the balls $l'$ with them, rotate together as an entirety, resting and bearing their weight through the balls $K^5$ upon the casing. The major wheel $g^2$ through being geared to a sprocket wheel on the shaft of the driving wheel, is driven thereby and rotates idly upon the crank axle, through the balls $l'$, being supported in vertical position by the series of balls $K^5$ against which its groove face $K^4$ bears. The major wheel therefore is both prevented from making frictional contact with the casing and is supported and held in vertical position by said balls $K^5$. When the clutch is reversed so as to free the minor and engage with the major wheel, the operation of the machine is correspondingly reversed.

By setting the clutch in an intermediate position where it is out of engagement with the sprocket wheels, the rider may maintain the crank axle against rotation, and may therefore coast without taking his feet from the pedals, inasmuch as the sprocket wheels are not laterally supported by and do not depend upon said clutch, but are supported through the balls in the rim grooves and bore grooves as shown in the drawings and herein described, against lateral movement.

The arrangement described by which the rider of a Safety bicycle is in coasting relieved from the necessity of taking his feet from the pedals is one of great advantage and inures largely to the convenience of the rider,—and the advantage is moreover one which is not confined to machines of the construction herein described, but would also be incident to a machine having but one sprocket wheel on the crank axle, and one sprocket chain connection with the driving wheel,—as for instance the arrangement shown in Fig. 2 of the drawings when one of the sprocket wheels is removed.

Having thus described my invention, I claim:

1. In a bicycle, in combination, a driving wheel, a crank axle, a clutch faced sprocket wheel supported through ball bearings against lateral but free for rotatory movement, upon said crank axle, a clutch adapted to be moved into and out of engagement with said sprocket wheel, and gearing connecting said sprocket wheel with the driving wheel, substantially as set forth.

2. In a bicycle, in combination, a crank axle, a clutch faced sprocket wheel the hub of which embodies a rim groove, a casing or boxing embodying an annular groove facing said rim groove, balls mounted in said grooves, and a clutch mounted on said axle, substantially as set forth.

3. In a bicycle, in combination, the crank axle, a sprocket wheel the hub of which embodies a rim groove and a bore groove, a casing or boxing embodying an annular groove facing said rim groove, balls mounted therein, a collar embodying a curved face, said collar being supported in such position that its curved face faces the bore groove and balls mounted in said last mentioned grooves, substantially as set forth.

4. In a bicycle, in combination with a driving wheel, a crank axle, clutch faced sprocket wheels mounted on said axle and geared with the driving wheel, the hubs of which sprocket wheels each embody a ball-race-groove, a clutch mounted on said axle, means for throwing the clutch, a casing encircling the clutch and embodying ball race grooves which respectively face the grooves upon the hubs to form ball races, and balls in said grooves, substantially as set forth.

5. In a bicycle, in combination with a driving wheel, a crank axle, clutch faced sprocket wheels mounted on said axle the hubs of which each embodies an inclined ball-race groove, which sprocket wheels are geared with the driving wheel, a clutch mounted on said axle, means for throwing the clutch, a casing encircling the clutch and overhanging the inner ends of the hubs of the sprocket wheels, which casing embodies inclined ball race grooves which respectively face the respective grooves upon the hubs to form ball races, and balls mounted in said races, substantially as set forth.

6. In a bicycle, a crank axle, a clutch faced sprocket wheel the bore of the hub of which embodies an inclined groove, a collar embodying an inclined curved face, said collar being so set that its curved face registers with the inclined groove of the hub to form a ball race, and balls mounted in said race, substantially as set forth.

7. In a bicycle, in combination with a driving wheel, a crank axle, clutch faced sprocket wheels mounted on said axle and geared with the driving wheel, the hubs of which sprocket wheels each embody an inclined rim groove and an inclined bore groove, a clutch mounted on said axle, means for throwing the clutch, a casing encircling the clutch and embodying inclined ball race grooves which face the rim grooves of the hubs to form ball races, balls in said races, collars or kindred projections each embodying a curved face mounted on the crank axle and each facing one of the bore grooves to form a ball race, and balls mounted in said races, substantially as set forth.

8. In combination with a bicycle, a crank axle, a clutch, a pair of clutch faced sprocket wheels, and a casing, ball races formed by inclined grooves in the casing and in the hubs of the wheels, ball races formed by inclined grooves in the bores of the sprocket wheels and in collars or projections on the crank axle, and balls in the respective ball races, substantially as set forth.

9. In combination with a bicycle, a crank axle, a clutch, a pair of clutch faced sprocket wheels, and a casing, ball races formed by inclined grooves in the casing and in the hubs of the wheels, ball races formed by inclined grooves in the bores of the sprocket wheels and in collars or projections on the crank axle, balls in the respective ball races, and means for taking up wear in the balls and in the races, substantially as set forth.

In testimony that I claim the foregoing as my invention I have hereunto signed my name this 29th day of April, 1891.

JOHN BENJAMIN EVANS.

In the presence of
F. NORMAN DIXON,
P. F. NAGLE.